United States Patent
Aebi et al.

(10) Patent No.: US 8,709,311 B2
(45) Date of Patent: Apr. 29, 2014

(54) METHOD AND DEVICE FOR EXTRACTING VAPORS IN AN INJECTION MOLDING MACHINE

(75) Inventors: Gerhard Aebi, Murten (CH); Philipp Wüthrich, Ennenda (CH); Wolfgang Zangerle, Hägglingen (CH)

(73) Assignee: Netstal Maschinen AG, Naefels (CH)

( * ) Notice: Subject to any disclaimer, the term of this patent is extended or adjusted under 35 U.S.C. 154(b) by 201 days.

(21) Appl. No.: 13/383,737

(22) PCT Filed: Jun. 28, 2010

(86) PCT No.: PCT/EP2010/059141
§ 371 (c)(1),
(2), (4) Date: Mar. 23, 2012

(87) PCT Pub. No.: WO2011/006751
PCT Pub. Date: Jan. 20, 2011

(65) Prior Publication Data
US 2012/0175815 A1 Jul. 12, 2012

(30) Foreign Application Priority Data
Jul. 15, 2009 (DE) .......................... 10 2009 033 134

(51) Int. Cl.
*B29C 45/34* (2006.01)
*B29C 45/17* (2006.01)

(52) U.S. Cl.
CPC ......... B29C 45/1701 (2013.01); B29C 45/1755 (2013.01); *B29C 2045/1797* (2013.01)
USPC ....... 264/37.14; 264/39; 264/328.1; 425/203; 425/210; 425/546

(58) Field of Classification Search
CPC ............ B29C 45/1701; B29C 45/1753; B29C 45/1755; B29C 2045/1797; B08B 15/02
USPC .............. 264/37.14, 39, 328.1; 425/210, 203, 425/546
See application file for complete search history.

(56) References Cited

U.S. PATENT DOCUMENTS

| 4,176,828 A | 12/1979 | Lange | |
| 5,217,661 A * | 6/1993 | Noguchi et al. | 264/39 |
| 5,460,505 A * | 10/1995 | Ito et al. | 425/151 |
| 5,961,898 A * | 10/1999 | Higashida et al. | 264/39 |
| 6,655,947 B1 * | 12/2003 | Hehl | 425/151 |
| 2003/0129936 A1 | 7/2003 | Shaikh | |

FOREIGN PATENT DOCUMENTS

| DE | 28 20 538 A1 | 11/1979 |
| DE | 34 23 224 C1 | 11/1985 |
| DE | 38 42 720 A1 | 6/1990 |
| JP | 58 067429 | 4/1983 |
| JP | 2002-301557 | * 10/2002 |

* cited by examiner

*Primary Examiner* — Jill Heitbrink
(74) *Attorney, Agent, or Firm* — Henry M. Feiereisen LLC

(57) ABSTRACT

The present invention relates to a method and to a device for extracting air in an injection molding device. The device comprises an extraction hood having a housing, in which one or more extraction ducts are provided, wherein the extraction hood can be disposed in the region of the injection nozzle of an injection unit, the housing at least partially encloses the injection nozzle of the injection unit, and air can be extracted from the region of the injection nozzle via openings (38) or ducts (34), and a ventilation device connected to the housing of the extraction hood (16) for flowing. According to the invention, the extraction hood and/or the ventilation device can be adjusted for implementing different extraction intensities in at least two operating modes.

12 Claims, 3 Drawing Sheets

METHOD AND DEVICE FOR EXTRACTING VAPORS IN AN INJECTION MOLDING MACHINE

CROSS-REFERENCES TO RELATED APPLICATIONS

This application is the U.S. National Stage of International Application No. PCT/EP2010/059141, filed Jun. 28, 2010, which designated the United States and has been published as International Publication No. WO 2011/006751 and which claims the priority of German Patent Application, Serial No. 10 2009 033 134.4, filed Jul. 15, 2009, pursuant to 35 U.S.C. 119(a)-(d).

BACKGROUND OF THE INVENTION

The present invention relates to a method and a device for extracting vapors in an injection molding machine.

It is known to use injection molding machines in so-called clean rooms for producing clean and sterile plastic products. This is of particular interest in the medical field. For this purpose, either the entire injection molding machine or at least the mold unit is arranged inside a clean room or a clean room cell. The goal is hereby to directly produce clean parts which can also be packaged in a clean and sterile condition. During the injection molding process itself—and also after the parts are de-molded from a mold—the injection-molded parts per se out in a clean and sterile manner, because the injection-molded parts are automatically disinfected by the high processing temperatures in excess of 200° C.

However, the initially clean and sterile produced product can be contaminated by the environment after the parts are ejected or removed and until the parts are packaged. These contaminants are frequently generated by the operation, in particular the movement, lubrication and the drives of an injection molding machine. Particle emissions can thereby be released, which contaminate the clean room and consequently also the product. The effects from contaminants can be reduced by specific structural measures at the injection molding machine, thus generally allowing the production of plastic parts under clean conditions in a clean room or in a clean room cell.

However, the time of the startup of the injection molding machine still remains problematic. It is frequently necessary to first purge and remove the old material remaining in the plasticizing or injection unit before transitioning to the actual production operation for producing the parts and products. However, it is frequently not possible to introduce such material into an injection mold in order to thereafter dispose of the first parts. Depending on the material and on the complexity of an injection mold, the material must be purged, when the injection nozzle is lifted from the mold or the platen, through the injection nozzle into the environment and, for example, into a catch container. Such purge process may be required, for example, when a mold is changed. Unlike in a normal production operation, the material then does not vanish in the mold, but is instead collected in the catch container as a steaming hot material. The material then emits a large number of dirt particles when cooling down, which significantly contaminate the clean room. Although this may not cause a problem for the desired production, these contaminants in the clean room can still adversely effect to the quality of parallel productions on a different machine in the same clean room. For example, if the contamination level of the clean room is monitored online, then the clean room would be identified as contaminated in an aforedescribed purge process. The entire production on all parallel machines may then have to be disposed of as waste.

It is an object of the present invention to provide a device and a method for efficiently eliminating the aforementioned disadvantages.

SUMMARY OF THE INVENTION

This object is solved by an extraction device for an injection molding machine, which includes an extraction hood arranged in a region of an injection nozzle of an injection unit and comprising a housing having at least one opening or extraction duct, the housing at least partially encompassing the injection nozzle of the injection unit and configured to draw in air from the region of the injection nozzle through the at least one opening or extraction duct, and a ventilation device connected with the housing of the extraction hood for fluid conduction to draw air from the extraction hood, wherein the extraction hood or the ventilation device, or both, are adjustable to realize different suction intensities in at least two operating modes of the injection molding machine, with a method for exhausting an injection molding machine, comprising suctioning air from a region of an injection nozzle of an injection molding device, wherein the air is suctioned at least during a purging process with a higher suction power level than during a normal injection molding operation.

According to a core idea of the invention, a layer and hence also vapors can be extracted with a different extraction intensity with an extraction hood arranged in the region of the injection nozzle and partially encompassing the injection nozzle.

This extraction intensity or extraction power can be adjusted by, for example, changing under constant fan operation the flow cross-section on the path from the region of the injection nozzle via the extraction hood to the fan. In particular, this flow cross-section may be changed with a measure on the extraction hood. The flow cross-section may also be changed downstream of the extraction hood.

Alternatively or in addition, the power of the suction fan may be changed. In this way, the volume airflow can be changed.

Several problems or situations can be addressed with this approach. On one hand, when material is purged from the injection device through the injection nozzle into a catch device, the additional contamination, in particular the rising vapors, are safely suctioned off by way of strong suction which is stronger than in normal operation. However, this stronger suction may cause problems during normal operation, because cooling can occur due to the airflow around the injection nozzle, potentially causing the quality of the melt to deteriorate noticeably. For example, the viscosity of the melt may hereby be changed such that a flawless injection molding process is no longer possible or the mold is not sufficiently filled.

For this reason, in normal operation—while the products are produced in the desired manner—a (lower) suction intensity is adjusted which, on one hand, prevents the injection unit from cooling down excessively in the region of the injection nozzle and, on the other hand, removes sufficient quantities of contaminants or vapors emanating from this region. Such contaminants can be generated, for example, because the injection nozzle is briefly lifted from the mold or from a platen after one or after each injection process.

A simple embodiment of the invention, for changing the flow cross-section in the extraction hood, includes an arrangement of two superpositioned metal plates which can be moved with respect to one another and which each have openings which can be brought into different overlapping positions depending on the relative displacement state. If the openings of the mutually displaceable metal plates overlap completely, then the flow cross-section is a maximum. The flow cross-section through the extraction hood can be stepwise reduced until the openings no longer overlap for a particular relative displacement of the metal plates, thereby reducing the flow cross-section to zero.

According to another possibility for changing the suction intensity, the power of the fan may be changed. This can be accomplished by using a corresponding control which can be automated commensurate with the operating mode.

It will be understood that those measures, namely adjusting the flow cross-section and adjusting the suction power, may also be combined.

Another advantageous embodiment is characterized in that a closable catch device for receiving the purged material is arranged below the extraction hood. In this way, excessive contamination after purging can be prevented.

BRIEF DESCRIPTION OF THE DRAWING

The following invention will now be described in more detail with reference to an actual exemplary embodiment illustrated in the appended drawings. The drawings show in.

DETAILED DESCRIPTION OF PREFERRED EMBODIMENTS

Figure 1:
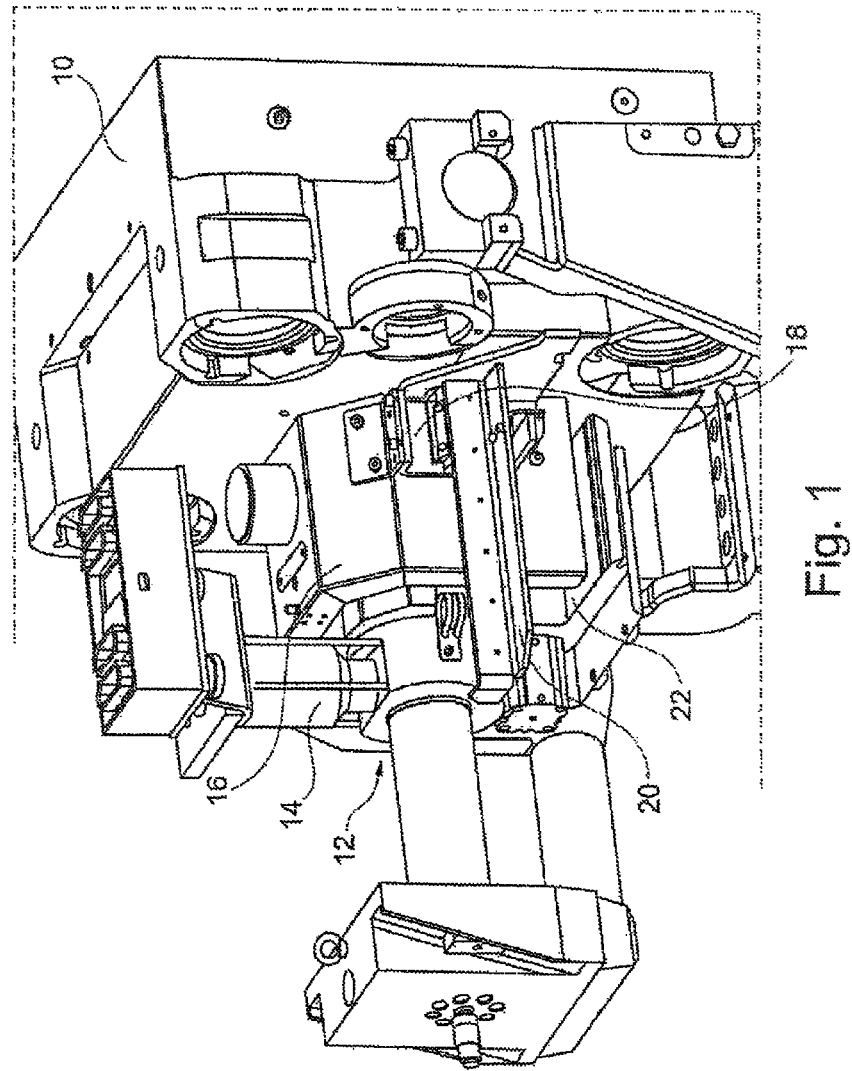
FIG. 1 a schematic perspective view of a unit composed of a platen, injection device and extraction device according to the invention, FIG. 2 another schematic perspective view of the arrangement of FIG. 1, however from a different perspective, FIG. 3 a top view on the injection device with the extraction hood encompassing the injection nozzle, FIG. 4 a schematic perspective view of an extraction hood according to the invention, and FIG. 5 a schematic perspective view with a partially broken-out outer housing part of the extraction hood of FIG. 4.
Figure 3:
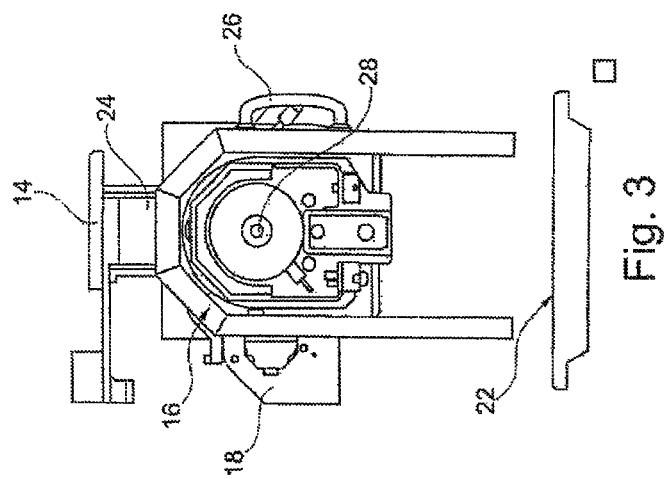
Figure 2:
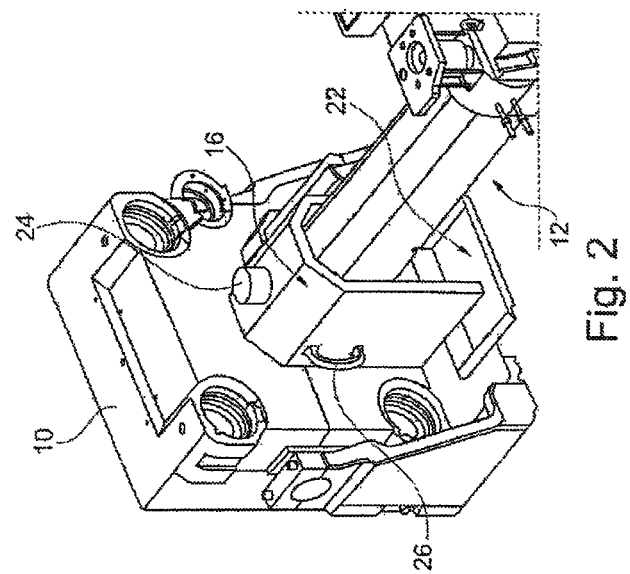

In the present concrete exemplary embodiment, the figures show parts of an injection molding machine, in particular an arrangement with a platen 10, on which an injection device of a plasticizing and injection unit is docked.

A mold may be attached on the clamping side of the platen 10, which is not shown in detail in the present example. Because the injection molding machines and systems with plasticizing and injection devices and platens are sufficiently known, they will not be discussed here in detail.

An extraction hood shaped as a downwardly open "U" is arranged around the front part of the injection device 12, in particular around the nozzle tip 28. The extraction hood has a housing which is substantially formed of an outer housing panel 30 and an inner housing panel 32. Bose housing panels define an interior space, also referred to as flow duct 34.

A handle 26 is provided on the outer housing panel 30 and a holding strap 17 on which also a holder 18 is arranged which can be moved back and forth in a certain movement range along a guide channel 20. The extraction hood 16 can be moved back and forth in a certain range with the handle 26 in an axial direction of the injection device 12.

Figure 5:
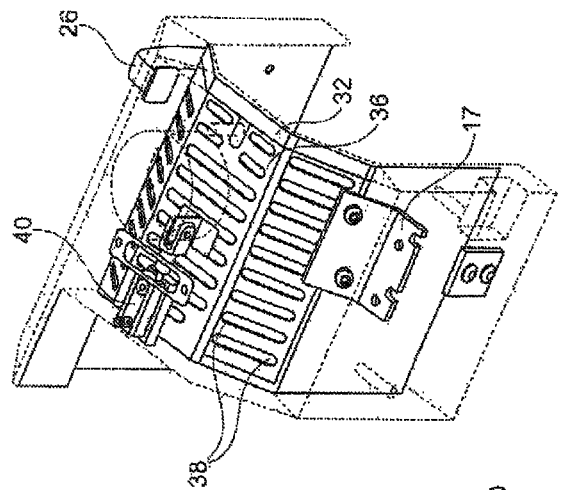
Figure 4:
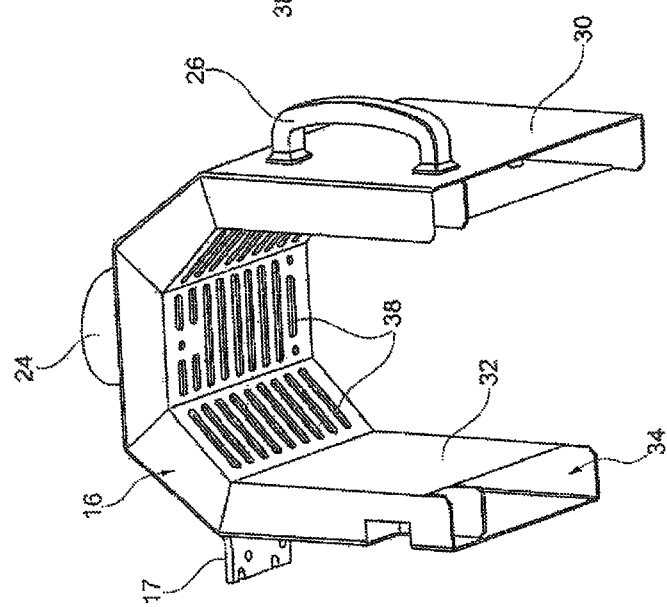

As seen in FIGS. 4 and 5, a plurality of slots 38 are arranged in the upper region the inner housing panel 32 of the extraction hood 16. In addition, a slide plate 36 is arranged on and in direct contact with the inner housing panel 32 of the extraction hood 16, encompassing the region of the slots, as schematically illustrated in FIG. 5. This slide plate is moveably supported on the inner housing panel and can be displaced relative to the inner housing panel 32 by a drive 40, which is connected, on one hand, with the housing of the extraction hood 16 and, on the other hand, with the slide plate 36.

Slots are provided in the slide plate 36 in the same manner as in the inner housing panel 32. By moving the slide plate 36, the slots in the slide plate 36 can be brought to a greater or lesser degree into overlap with the slots disposed in the inner housing panel 32. The degree of overlap hereby depends on the degree of the relative displacement.

The slide plate 36 is displaced in FIGS. 4 and 5 in such a way that the slots of the slide plate almost entirely overlap with the inner housing panel 32. This provides a maximum flow cross-section, through which air can move from the interior space encompassed by the housing into the duct 34 between the inner housing panel 32 and the outer housing panel 30 to the fitting 24, where it can be suctioned off.

A suction line (not shown), through which the air can be suctioned off with a likewise unillustrated suction fan, is arranged on the fitting 24. In this way, the air is moved out of the clean room from the interior space of the U-shaped housing, the extraction hood, the extraction line and the fan, thereby preventing possible contaminants and vapors as much as possible from reaching the clean room and/or remaining in the clean room.

By operating the drive 40, which may be controlled by a controller, the flow cross-section may be changed by displacing the slide plate 36 commensurate with the overlap of the slots.

A different quantity of air can then be removed from the interior space of the housing, even with constant fan power. During the purge operation, the suction power is increased (i.e., the flow cross-section is increased) to ensure adequate suction. During the "normal" injection operation—representing the normal operation of the injection molding machine for producing the products—the suction power is reduced by displacing the slide plate 36, thereby preventing the injection device 12 from cooling down in the region of the injection nozzle.

It will be understood that the suction power may also be additionally varied by a corresponding decrease/increase of the suction power of the corresponding suction fan.

The extraction hood may also be moved towards the rear by movably arranging the extraction hood by way of the holder 18 and the guide channel 20, in order to provide access to the injection nozzle.

According to another advantageous embodiment, the catch basin 22 which is arranged below the extraction hood 16 may be designed so as to be closable, so that the extraction hood is closed after a purge process to prevent additional evaporation.

As illustrated in FIG. 4, the duct 34 between the inner housing panel 32 and the outer housing panel 30 extends downward in the U-shaped legs, allowing the air to be also evacuated directly from the region of the catch basin 22.

With the present invention, contamination during the purge process can be readily prevented, without risking a disadvantageous reduction in the melt quality during the normal production due to excessive cooling.

What is claimed is:

1. An extraction device for an injection molding machine, comprising:
   an extraction hood arranged in a region of an injection nozzle of an injection unit and comprising a housing having at least one opening or extraction duct, the housing at least partially encompassing the injection nozzle of the injection unit and configured to draw in air from the region of the injection nozzle through the at least one opening or extraction duct, and a ventilation device connected with the housing of the extraction hood for fluid conduction to draw air from the extraction hood, wherein the extraction hood or the ventilation device, or both, are adjustable such that in one of at least two operating modes of the injection molding machine a suction is established which is higher than a suction during another one of the at least two operating modes.

2. The extraction device of claim 1, wherein the ventilation device comprises a suction fan having adjustable suction power.

3. The extraction device of claim 2, wherein the adjustable suction power of the suction fan is adjustable to at least two suction power levels.

4. The extraction device of claim 1, wherein the housing further comprises devices for adjusting a flow cross-section of the at least one opening or duct.

5. The extraction device of claim 4, wherein the housing comprises a metal panel having openings and a slide plate which also has openings and is movably attached on the metal sheet, wherein the flow cross-section can be adjusted by adjusting an overlap between the openings of the slide plate and the openings in the metal panel.

6. The extraction device of claim 5, further comprising a drive device for moving the slide plate relative to the metal panel.

7. The extraction device of claim 1, further comprising a catch container arranged substantially below the extraction hood for receiving purged material.

8. The extraction device of claim 7, wherein the catch container is constructed so as to be closable.

9. A method for exhausting an injection molding machine, comprising suctioning air from a region of an injection nozzle of an injection molding device, wherein the air is suctioned at least during a purging process with a higher suction power level than suction performed during a normal injection molding operation.

10. The method of claim 9, further comprising adjusting a flow cross-section in a housing of an extraction hood for changing the suction power level.

11. The method of claim 9, further comprising operating a suction device with different power for changing the suction power.

12. The method of claim 11, wherein the suction device comprises a fan.

* * * * *